United States Patent Office 3,210,401
Patented Oct. 5, 1965

3,210,401
ETHER-ESTERS OF 2'-HYDROXYMETHYL-2-BIPHENYL CARBOXYLIC ACID
Murray G. Sturrock and Edwin L. Cline, Pittsburgh, Pa., assignors to Koppers Company, Inc., a corporation of Delaware
No Drawing. Filed Sept. 20, 1962, Ser. No. 225,161
8 Claims. (Cl. 260—473)

This invention relates to aromatic compounds having ether and ester linkages. In one specific aspect, it relates to the ether-esters of 2'-hydroxymethyl-2-biphenyl carboxylic acid.

A practical method of preparing ortho-ortho' disubstituted biphenyl derivatives by the ozonization of phenanthrene has been described by Murray G. Sturrock et al., U.S. 2,898,350 and U.S. 2,942,030. Thus, there has become readily available 2'-hydroxymethyl-2-biphenyl carboxylic acid and the internal ester of 2'-hydroxymethyl-2-biphenyl carboxylic acid, known as diphenide.

It is an object of the present invention to provide a new class of aromatic compounds having ether and ester linkages which have outstanding utility as plasticizers.

In accordance with the invention, we have discovered aromatic compounds having ether and ester linkages of the formula:

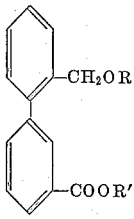

In the above formula R is a member selected from the group consisting of alkyl having from 1–12 carbon atoms, alkenyl having from 2–5 carbon atoms, aralkyl having up to 9 carbon atoms and R' is a member selected from the group consisting of alkyl having from 1–12 carbon atoms, alkenyl having from 2–18 carbon atoms, aralkyl having up to 8 carbon atoms, phenyl, furfuryl and tetrahydrofurfuryl.

The ether-esters of 2'-hydroxymethyl-2-biphenyl carboxylic acid have been shown to possess outstanding propetries as plasticizers for polyester and acrylic coatings such as thermosetting acrylic lacquers and thermoplastic acrylic enamels used in the automobile industry. In an evaluation of chemical compounds as plasticizers for synthetic resins, the most important criteria insofar as performance is concerned are permanence, temperature behavior and stability to light and heat. Permanence is conveniently determined by measuring, on a comparative basis, the volatility of a given compound from a plasticized resin specimen. Temperature behavior of plasticized resinous compositions is important since most plastic articles are subjected to wide variations in temperature incurred under ordinary conditions. A good plasticizer must have the ability to impart to the plasticized resin relatively uniform mechanical properties over a broad temperature range. The heat and light stability of a plasticized resin are particularly significant in synthetic resinous finishes used in the automobile industry since the stability against discoloration is an important consideration. When evaluated in accordance with the above standard, we have found that the properties of our novel compounds especially the high boiling point, the low vapor pressure and the low volatility, make these compounds particularly suitable as plasticizers.

The ether-esters of 2'-hydroxymethyl-2-biphenyl carboxylic acid may be prepared by the method described in the copending application of M. G. Sturrock et al., S.N. 217,534, filed August 17, 1962.

This method gives the ether-esters of 2'-hydroxymethyl-2-biphenyl carboxylic acid from the direct reaction of diphenide with a saturated or unsaturated aliphatic alcohol in the presence of an esterification catalyst at a pressure of 0–900 p.s.i.g. and at a temperature of 100–200° C.

The reaction is illustrated by the equation:

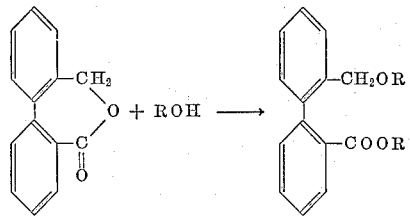

wherein R is a member selected from the group consisting of alkyl having from 1–12 carbon atoms and alkenyl having from 2–5 carbon atoms.

Alcohols suitable for the reaction are saturated or unsaturated aliphatic alcohols. Useful saturated alcohols include methyl alcohol, ethyl alcohol, propyl alcohols, butyl alcohols, amyl alcohol, hexanols, 3-heptanol, 2-ethylhexanol and dodecanol. It is desirable to use alcohols which do not polymerize. When alcohols are used which tend to polymerize, such as unsaturated alcohols, e.g. allyl alcohol, 2-butene-1-ol, 4-pentene-1-ol, the presence of a vinyl polymerization inhibitor is required. Useful inhibitors for the polymerizing alcohols are added in a range of 0.01–1 percent based on the weight of the unsaturated alcohol and include hydroquinone, anthraquinone, 2,5-di-t-butylhydroquinone, di-t-butyl-p-cresol, copper, alkylated bisphenol, chloranil, methylene blue and p-hydroxydiphenylamine.

The reaction is carried on in the presence of an esterification catalyst. Common strong acid catalysts are suitable, and it is preferable to use acids having dehydrating properties, such as p-toluenesulfonic acid, sulfuric acid, hydrofluoric acid and fluorosulfonic acid. The latter provide better yields by shifting the equilibrium in favor of the ester formation. Also, esterification ion exchange resins may be used, e.g. Amberlite–120-acid form (a commercially available sulfonated styrene-divinylbenzene ion exchange resin), Dowex–50-acid form (a commerically available styrene-divinylbenzene ion exchange resin containing sulfonic acid groups) and Nalcite–HCR-acid form (a commercially available cation exchange resin made from styrene and divinylbenzene and containing sulfonic acid groups).

In order to obtain good yields of the product, it is necessary that the ratio of alcohol to diphenide be in excess of about 5 to 1. Since the alcohol in addition to being a reactant also provides the reaction medium, it is desirable that larger amounts be used. The amount of acid catalyst used ranges from about 0.1 to 10 percent based on the weight of lactone. Using more than the catalytic amount is wasteful, whereas using less than the catalytic amount results in failure to initiate the reaction.

It is preferred that the reaction take place in the absence of oxygen by sweeping the pressurized system with an inert gas. Conveniently, the reaction is run in an inert atmosphere, such as nitrogen. This has an additional function of providing the pressure required for the reaction.

The temperature range for the reaction is between 100 and 200° C. It is found that below 100° C. (boling point of sec-butyl alcohol) extended reaction time is required to get substantial yields and that at elevated temperatures above 200° C., decreased yields are obtained.

Suitable pressure for the reaction varies from 0 to 900 p.s.i.g. In determining the desired pressure, it should be noted that the pressure is directly related to the temperature required to form the ether-ester. In particular, pressure is required for those alcohols which have boiling points below 100° C. Thus, for example, methyl alcohol gives little reaction at 65° C. and atmospheric pressure, but reacts to produce good yields at 200° C. and 900 p.s.i.g. Pressure required for the system may be supplied by the vapor pressure of the charge or by an inert gas, such as nitrogen.

The time required for the reaction is usually about 2–5 hours. A shorter time period results in incomplete reaction, whereas a longer time period causes the reaction to reverse and thereby decreases the yield.

Transesterification of the ester group may be achieved by reacting the ether-ester of 2'-hydroxymethyl-2-biphenyl carboxylic acid, prepared by the method described above, with an alcohol having a boiling point higher than the alcohol used in preparing the original ester in the presence of a trans-esterification catalyst and at a temperature above the boiling point of the lower boiling alcohol. This reaction is illustrated by the equation:

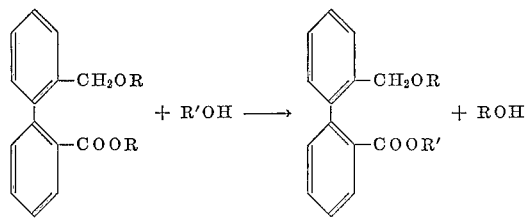

wherein R is a member selected from the group consisting a alkyl having from 1–12 carbon atoms, alkenyl having from 2–18 carbon atoms, aralkyl having up to 9 carbon atoms, and phenyl and R' is a member selected from the group consisting of alkyl having from 1–12 carbon atoms, alkenyl having from 2–18 carbon atoms, aralkyl having up to 8 carbon atoms, furfuryl and tetrahydrofurfuryl.

Transesterification catalysts useful in this reaction are those catalysts described above as useful in the esterification reaction. The preferred catalysts are p-toluene sulfonic acid, sulfuric acid, hydrofluoric and fluorosulfonic acid.

Primary and secondary alcohols that are suitable include saturated aliphatic alcohols, e.g., methanol, ethanol, propanol, butanol, pentanol, n-hexanol, 3-heptanol, 2-ethyl-hexanol, and dodecanol; unsaturated aliphatic alcohols, e.g. allyl alcohol, 2-buten-1-ol, 4-penten-1-ol, geraniol, and olelyl alcohol; aromatic alcohols having up to 9 carbon atoms, e.g., benzyl alcohol, phenylethyl alcohol, and cinnamyl alcohol; and heterocylic alcohols, e.g., furfuryl alcohol and tetrahydrofurfuryl alcohol.

Alternatively, the ether-esters of 2'-hydroxymethyl-2-biphenyl carboxylic acid may be prepared by a more tedious two-step method. The first step involves the etherification of the 2'-hydroxymethyl-2-biphenyl carboxylic acid by conventional methods, such as the Williamson synthesis, i.e., the reaction between a metallic alkoxide and an alkyl halide; or by treating the compound with dimethylsulfate in an alkaline solution. These conventional methods may be used to prepare ethers from aromatic alcohols, e.g. benzyl alcohol, phenylethyl alcohol, and cinnamyl alcohol and phenyl derivatives in addition to ethers from saturated or unsaturated alcohols.

The ether of 2'-hydroxymethyl-biphenyl carboxylic acid is thereafter esterified by a second step involving the reaction with compounds having free hydroxy groups in the presence of an esterification catalyst and under standard esterification conditions. It is thereby possible to prepare the esters of the alcohols listed above as suitable for the transesterification reaction. The phenyl esters are made from the reaction of sodium phenoxide with the acid chloride of an ether of 2'-hydroxymethyl-2-biphenyl carboxylic acid.

Our invention is further illustrated by the following examples:

EXAMPLE I

*Preparation of methyl-2'-methoxymethyl-2-biphenylcarboxylate*

A one-gallon stirred autoclave was charged with 42 g. (0.2 mole) of diphenide, 1500 ml. of methanol, and 2 g. of p-toluenesulfonic acid. The system was purged with nitrogen and heated to 200° C. under a nitrogen pressure of 900 p.s.i.g. for four hours. After evaporation of the unreacted alcohol, 53.1 g. (94.3 percent yield) of solid methyl-2'-methoxymethyl - 2 - biphenylcarboxylate (M.P. 58–62° C.) were recovered. Purification by crystallization from n-hexane raised the melting point of the solid to 61–62° C. The solid was compared to a standard which was obtained by treating diphenide with dimethylsulfate, acidifying the product and esterifying with methanol. The solid was found to be identical to the standard in infrared spectrum, melting point, the mixed melting point of the solid and the standard.

EXAMPLE II

*Preparation of n-butyl-2'-butoxymethyl-2-biphenylcarboxylate*

Following the procedure of Example I, 210 g. of diphenide, 150 ml. of n-butyl alcohol and 21 g. of p-toluenesulfonic acid were heated at 200° C. under a nitrogen pressure of about 550 p.s.i.g. for one hour. The product was diluted with benzene, washed with sodium bicarbonate solution and finally with water to remove the acid catalyst. The organic phase was evaporated to dryness under vacuum and the viscous residue allowed to stand ovenight. After removal of the unreacted diphenide by filtration, 292 g. (85.7 percent yield) of crude n-butyl-2'-butoxymethyl-2-bipheylcarboxylate was obtained. The crude material was distilled under reduced pressure and the infrared analysis of the product (B.P. 184–185° C. at 0.7 mm. Hg) showed the presence of ether and ester linkages. Further identification was by caustic soda hydrolysis and recovery of the ether acid. A comparison of the neutralization equivalent showed: calc'd 284; found 282.

EXAMPLE III

*Preparation of sec-butyl-2'-sec-butoxymethyl-2-biphenyl carboxylate*

In a two-liter flask equipped with a stirrer, 63 g. of diphenide, 100 ml. of sec-butyl alcohol, and 3 g. of p-toluenesulfonic acid were heated at the reflux temperature (100° C.) and at atmospheric pressure for a period of 5 hours. After the unreacted alcohol was removed by distillation, the residue was diluted with benzene, neutralized with sodium bicarbonate solution and washed with water. The benzene extract was evaporated under vacuum and the oily residue was lalowed to stand overnight. After removal of the unreacted diphenide by filtration, the crude ether-ester was obtained. The product was purified by vacuum distillation to give sec-butyl-2'-sec-butoxymethyl-2-biphenylcarboxylate.

EXAMPLE IV

*Preparation of allyl-2'-allyloxymethyl-2-biphenylcarboxylate*

Using the procedure of Example I, 84 g. of diphenide, 946 ml. of allyl alcohol, 0.1 g. of copper and 8.4 g. of p-toluenesulfonic acid were heated at 175° C. and at a maximum pressure of 300 p.s.i.g. After two hours the autoclave was discharged and the reaction mixture washed with water. The organic layer was separated, dissolved in ether, and dried over calcium chloride. The ether solution was evaporated to dryness on a steam bath to yield 63.8 g. of residue. The residue was purified by vacuum distillation to give 23.3 g. (18.9 percent) of allyl-2'-allyloxymethyl-2-biphenylcarboxylate (B.P. 154–155° C. at 0.15 mm. Hg). Infrared analysis showed the presence of ether, ester and olefinic linkages.

EXAMPLE V

*Preparation of butyl-2'-methoxymethyl-2-biphenyl carboxylate*

23 grams (0.1 m.) of pure 2'-hydroxymethyl-2-biphenyl carboxylic acid were dissolved in 150 grams of 30 percent NaOH and the solution was heated with agitation at 95° C. for 2 hours. The reaction mixture was cooled to 65° C. and 52 grams (0.4 m.) of fresh dimethyl sulfate were added over a one-hour period. The temperature was maintained at 65–70° C. during the addition and then stirred an additional hour. After cooling the reaction mixture to 30° C. more dimethyl sulfate, 52 grams, was added and agitation continued for another hour. The mixture was extracted with ether and the extract was evaporated to dryness to give 4.4 grams (17 percent yield) of crude methyl-methyl ether-ester, M.P. 60.5–62.5° C. The aqueous phase was acidified and filtered to give 18.7 grams (81 percent yield) of crude ether-acid, 2'-methoxymethyl-2-biphenylcarboxylic acid, M.P. 79–85° C. Recrystallization from ethanol gave 15 grams of pure ether-acid, M.P. 91.5–92.5° C., neutral equivalent 240 (theory 242). The fact that the reaction mixture was kept strongly alkaline would prevent esterification of the acid group and give the ether-acid.

The ester was prepared by reacting 12.1 grams (0.05 mole) of 2'-methoxymethyl-2-biphenylcarboxylic acid, 15 grams (0.2 mole) of n-butyl alcohol, 1.0 gram of para-toluene sulphonic acid and 125 ml. of toluene at reflux with stiring until no further evidence of water evolution was evident in the Dean-Stark trap. The toluene solution was washed with 5 percent sodium carbonate and then with water. The organic layer was separated and evaporated to dryness under reduced pressure to give 14.5 grams of oily residue. This material was distilled at 0.3 mm. pressure to give 13.0 grams of product B.P. 160–161° C. at 0.3 mm. pressure, $n_D^{29}$ 1.15413. This represents a yield of 87 percent based on the ether-acid charged to the esterification. The infrared spectral characteristics of the new compound are tabulated below as follows:

| Absorption band (microns) | Intensity | Structural assignment |
|---|---|---|
| 3.4–3.5 | Medium | Alkyl groups. |
| 5.84 | Strong | Aryl ester C=O. |
| 6.24 | Medium | Phenyl ring. |
| 6.35 | Weak | Do. |
| 6.84 | do | Alkyl groups. |
| 6.94 | do | Do. |
| 7.26 | Medium | Terminal CH₃ group. |
| 7.79 | Strong | Aryl ester C—O pattern. |
| 8.05 | Medium | Do. |
| 8.4 | Weak | Do. |
| 8.94 | Strong | Do. |
| 9.16 | do | Alkyl ether C—O—C. |
| 13.25 | do | Ortho disubstituted benzene. |
| 14.1 | Medium | Do. |

EXAMPLE VI

*Preparation of butyl-2'-methoxymethyl-2-biphenyl carboxylate*

To 20.0 grams 2'-methoxymethyl-2-methylbiphenyl carboxylate, prepared as shown in Example I, were added 200 ml. n-butyl alcohol and 1 gram toluene sulphonic acid and the mixture was refluxed under a 12 inch helices packed distillation column for 4 hours. The distillate, methyl alcohol, was removed at intervals during the course of the reaction. The distillation residue was diluted with benzene, washed with sodium carbonate solution and water, and the organic phase evaporated under reduced pressure in the usual manner. A crude yield of 22 grams of methyl ether-butyl ester equivalent to 95 percent was recovered. Upon redistillation at 0.3 mm. pressure, 19.5 grams of material similar in every respect to the product of Example V was obtained.

EXAMPLE VII

*n-Butyl-2'-benzyloxymethyl - 2 - biphenylcarboxylate prepared by Williamson Synthesis followed by esterification*

112 g. (0.49 mole) of 2'-hydroxymethyl-2-biphenyl carboxylic acid was slurred with 2500 ml. of exylene. 25.4 g. (1.1 moles) of sodium metal dispersed in 250 ml. of xylene, was added at room temperature over one hour. The mixture was heated to reflux over 3.5 hours then refluxed for one hour. The reaction mixture was cooled and filtered. The sodium salt so obtained was immediately slurried with 300 ml. of xylene. To this mixture was added 200 g. (1.2 moles) of benzyl bromide over 1.5 hours. The mixture was heated at 130° C. for 4.5 hours, cooled and filtered to remove suspended solids. The filtrate was stripped of solvent and unreacted benzyl bromide under reduced pressure to give 95 g. of crude benzyl-2'-benzyloxymethyl - 2 - biphenylcarboxylate. The crude extract was hydrolyzed with 150 ml. of 25 percent NaOH in 250 ml. of ethanol to give 72 g. of 2'-benzyloxymethyl-2-biphenylcarboxylic acid (47 percent yield based on alcohol-acid charged); neutral equivalent, 322; theory 318. This ether-acid was esterified with n-butyl alcohol using p-toluenesulfonic acid as the catalyst to give 74 g. (44 percent yield) of n-butyl-2'-benzyloxymethyl-2-biphenylcarboxylate. Purification was accomplished chromatographically using activated alumina. Calculated for $C_{25}H_{26}O_3$: Sap. Equiv. 374; found 365; boiling point 192° C./0.18 mm.

EXAMPLE VIII

*Benzyl-2'-butoxymethyl-2-biphenylcarboxylate*

(1) PREPARED BY WILLIAMSON SYNTHESIS FOLLOWED BY ESTERIFICATION

To a solution of 48 grams (0.21 m.) of 2'-hydroxymethyl-2-biphenyl carboxylic acid in 500 ml. of dry xylene was added 9.3 grams (0.4 m.) of sodium metal. The mixture was refluxed with agitation for 3 hours. The sodium salt was filtered and dissolved in 300 ml. of n-butanol. Then 82 grams (0.6 m.) of n-butyl bromide were added and the mixture was heated under reflux for 20 hours. The reaction mixture was cooled, filtered, and stripped of solvents under reduced pressure. The distillation residue was dissolved in ether and the solution was washed with 5 percent $Na_2CO_3$ and water. Evaporation of the ether gave 30.4 grams (42.5 percent yield) of crude butyl ether-butyl ester. Acidification of the aqueous phase gave 23 grams of unreacted 2'-hydroxymethyl-2-biphenyl carboxylic acid. Distillation of the ether extract through a Vigreux column gave a pale yellow liquid with B.P. 185–186° C./0.7 mm., whose structure was shown by infrared to be identical to the product of Example II.

The butyl ether-butyl ester, 20 g., was hydrolyzed with alcoholic caustic as in Example VIII to give a quantitative yield of 2'-butoxymethyl-2-biphenyl carboxylic acid, a pale yellow oil with neutral equivalent 282; theory 284. 11 g. (0.04 mole) of the ether-acid was esterified with benzyl alcohol in the usual manner to give a quantitative yield of benzyl-2'-butoxymethyl-2-biphenyl carboxylate, B.P. 211° C./0.9 mm., $n_D^{23}$ 1.5670. Infrared analysis substantiated the structure.

(2) PREPARED BY TRANSESTERIFICATION WITH BENZYL ALCOHOL 45.3 gms. of butyl-2'-butoxymethyl-biphenyl carboxylate prepared in Example II, 70 ml. of benzyl alcohol, and 1.0 g. of sodium methoxide were refluxed for 4 hours, during which time n-butyl alcohol was removed at regular intervals. The residue was diluted with benzene, the solution was washed with 10 percent HCl, 5 percent Na₂CO₃ and then with water. Distillation gave 40 g. (81 percent yield) of material with B.P. 192°/0.2 mm., 210°/0.8 mm., $n_D^{23}$ 1.5675, and identical in spectrum to ether-ester prepared by the Williamson Synthesis, above. Calculated for $C_{25}H_{26}O_3$: Sap. Equiv. 374; found 380.

We claim:

1. A chemical compound of the formula:

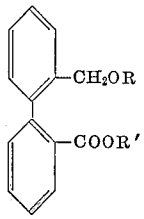

wherein R is a member selected from the group consisting of alkyl having from 1–12 carbon atoms, alkenyl having from 2–5 carbon atoms, aralkyl having up to 9 carbon atoms and phenyl and R' is a member selected from the group consisting of alkyl having from 1–12 carbon atoms, alkenyl having from 2–18 carbon atoms, aralkyl of up to 9 carbon atoms, phenyl, furfuryl and tetrahydrofurfuryl.

2. A compound according to claim 1 wherein R and R' are alkyl having from 1–12 carbon atoms.

3. A compound according to claim 1 wherein R is alkyl having from 1–12 carbon atoms and R' is aralkyl having up to 9 carbon atoms.

4. A compound according to claim 1 wherein R and R' are aralkyl having up to 8 carbon atoms.

5. Methyl-2'-methoxymethyl-2-biphenyl carboxylate.
6. n-Butyl-2'-methoxymethyl-2-biphenyl carboxylate.
7. Benzyl-2'-n-butoxymethyl-2-biphenyl carboxylate.
8. n-Butyl-2'-benzyloxymethyl-2-biphenyl carboxylate.

References Cited by the Examiner

Bretscher et al.: J. Chem. Soc., pp. 1493–1504 (1928).
Rule et al.: J. Chem. Soc., pp 925–8 (1927).

LORRAINE A. WEINBERGER, *Primary Examiner.*
LEON ZITVER, *Examiner.*